Patented May 16, 1933

1,909,784

UNITED STATES PATENT OFFICE

EMIL E. NOVOTNY, OF PHILADELPHIA, PENNSYLVANIA, ASSIGNOR TO JOHN STOGDELL STOKES, OF HUNTINGTON VALLEY, PENNSYLVANIA

ABRASIVE PRODUCT AND METHOD OF MAKING THE SAME

No Drawing.  Application filed May 17, 1930. Serial No. 453,400.

This invention relates to the manufacture of abrasive bodies bonded with a potentially reactive resin and most particularly to the production of such abrasive bodies which are large, heavy and of thick cross sections whereby the interior of such bodies will be as strong as the outside faces.

A further object of my invention is to produce these abrasive bodies by a new, rapid and inexpensive method by minimizing or eliminating the adhesive charactersitics of the mixed mass. This is accomplished through the use of a liquid or semi-liquid body mixed with the abrasive grain either prior to or after the addition of the potentially reactive resin, whereby the resin is in a more or less dispersed phase with the non-solvent or modifier in a continuous phase providing a smooth, non-coherent mix at ordinary atmospheric pressures, thus eliminating frequent screening of the mixed masses prior to the molding operation as has to be done when a resin solvent is used for the purpose of uniformly coating the faces of the abrasive granules. Upon the application of pressure in the mold, this film of non-solvent is broken down, causing the resinous coating to assume a continuous adhesive structure with the non-solvent dispersed therein as a modifier for said resin mass.

Most any suitable abrasive grain may be used or mixtures of various abrasive grains may be desired, such as, for example, silicon carbide, aluminous oxide, etc., and these bodies may be in the shape of wheels, segments, flat porous blocks or whatever shape is demanded.

As a resin binder I prefer to use a synthetic resin product such as that made of a phenolic body combined with a suitable aldehyde or equivalent therefor such as formaldehyde, its polymers and derivatives, furfural, its derivatives, carbohydrates, various resinous bodies, etc. It is, of course, to be understood that other synthetic resin products are useful for my purpose, such as, for example, resins of the polyhydric alcohol—polybasic acid type, or of urea, thiourea or mixtures of these combined with a suitable aldehyde such as formaldehyde or furfural. Furthermore, that I may use mixtures of these various resins in order to provide an alloy having the toughness desired.

In place of synthetic resins I may use various natural resins such as shelac, gum benzoin, gum congo, gum copal, gum damar, gum elemi, gum ghatti, gum kauri, gum manila, gum pontianak and gum accroides. These products can be used alone or in admixture with each other or with other modifying materials or in admixture with any desired proportion of the synthetic resin products previously discussed. These products are more or less heat hardening and have certain properties of toughness, etc. which are highly desirable for the production of certain types of abrasive wheels.

Of the thermo-reactive natural resins it is my preference to use gum accroides commonly known as Black-boy gum and which is an xanthorrhea resin obtained from several species of xanthorrhea trees whose habitat is Australia. This product I have found will readily combine with various aldehydes and their derivatives such as, for example, formaldehyde, its polymers such as trioxymethylene, its derivatives as hexamethylenetetramine, and various condensation products of phenols or of acetone with aldehydes and aldehyde derivatives. Gum accroides, when finely pulverized and mixed with say ten per cent of hexamethylenetetramine, becomes a rapidly curing resin mass which may be hardened to an ultimate set and infusible form resembling in many respects the synthetic phenol resins but having properties of greater softness and less brittleness than these. The gum is soluble in the alcohols and in practically all aldehydes such as, for example, furfural. The product is compatible with the synthetic resins themselves and may be mixed therewith in all proportions, in which case it is optional whether a hardening agent is added to the gum accroides product or not inasmuch as the potentially reactive synthetic resins themselves often supply sufficient reactivity to the product without further addition of accelerators or hardening agents.

Gum accroides is a very cheap material, selling at about $.035 per pound, can be bleached through the use of suitable reagents to a lighter color or may be purified as by the use of suitable solvents including the alcohols and furfural and may be separated from foreign bodies as by distillation under vacuum, filtration, centrifuging or precipitation. The product may likewise be combined with various phenolic bodies as in a resin forming reaction, any free phenolic body being subsequently combined with a suitable aldehyde.

Gum accroides is mixable with resins of the glyptal, urea and/or thiourea types and may be incorporated therewith during the formation of such resins, if desired, either prior to, during or after the completion of the resin reaction. It is further compatible with carbohydrate esters such as, for example, nitro and acetic cellulose.

The liquid or semi-liquid body which I may term a dispersoid is preferably of such a nature that it will tend to disperse or precipitate the synthetic resin into a dispersed phase but which is preferably compatible with the resin, whereby the nature of the resinous body may be modified to eliminate some of its inherent brittleness. These dispersoids are non-solvents for the resin at least during the mixing operation and may consist of various diverse liquids such as carbon tetrachloride, benzol, xylol, etc., but I have found, however, that the alkyl esters of fatty acids are most suitable for my purpose; that is, the esters of the alcohols such as ethyl, methyl, butyl, amyl, furfur, etc. combined with various fatty acids such as, for example, oleic, linoleic, lauric, palmitic, margaric and stearic. Of these products I prefer to use either ethyl or butyl oleates or stearates and my particular choice being butyl oleate. This product has the property of wetting the synthetic resin and the grain surfaces without entering into solution with such synthetic resin and may be used in various ways to provide a mass of abrasive grains, resin and dispersoid, which can be readily mixed and handled during the pressing of such abrasive wheels. If a liquid resin such as a reaction product of phenol and formaldehyde remaining molten at ordinary room temperatures be used either alone or in combination with a dry resin or one having a higher melting point and the abrasive grains be coated with such liquid resin, the dispersoid may be added either prior to the addition of any resinous material or together with or after the addition of a part or all of such resinous material, and it will be found that the mass will mix readily and will form a granular, evenly wetted compound with the resinous body suspended upon the abrasive grain and relatively noncoherent until application of higher pressures makes the mass form the desired shape preferably in a cold pressing operation although slightly warmed or heated molds are considered equivalent for my purpose.

The butyl oleate or other alkyl ester of a fatty acid if added to the abrasive grain before the addition of any resin thereto will coat the abrasive grain on all faces with great uniformity, and if, subsequently, a reactive resin is added as, for example, a liquid type of phenol-formaldehyde product, such liquid will be precipitated and dispersed within the butyl oleate coating, said oleate coating being in a continuous phase and holding the precipitated resinous material on to the abrasive grain and minimizing to a great extent the adhesiveness of the tacky, balsamlike liquid synethic resin thus providing a smooth, uniform mix of a gummy resinous mass which may be readily molded in molds without the addition of any dry resin whatsoever.

The uniform mixture of this gummy resinous mass is, however, loosely granular due to the use of the dispersoid or, as before stated, butyl oleate. The butyl oleate uniformly wets and simultaneously precipitates the liquid reactive resin, coating the particles thereof with a relatively continuous film. This film prevents cohesion at ordinary pressures, but the mass readily coheres upon being pressed in molds at somewhat elevated pressures.

The dispersoid, more specifically the butyl oleate, if added to the abrasive grain after such grain had been coated with the reactive resin, will also disperse such liquid reactive resin coating and provide a mass also of a loose, granular nature with the reactive resin suspended on each grain and with the particle size of the mass not much larger than the size of the largest coated abrasive grain used.

Optional methods to meet the preference of the wheelmakers are readily available inasmuch as a desired amount of pulverized dry resin may be added to this mix of abrasive grain and liquid, reactive resin at any point in the mixing process. More specifically stated, the liquid resin and dry pulverized resin may be mixed together prior to the coating of the abrasive grain, and the dispersoid, specifically butyl oleate, may be added before, during or after such mixing prior to or after the introduction of either or both resins to the mass of abrasive grain to be so coated.

Furthermore, dry resin alone may be used and this dry, reactive, finely pulverized resin of either a natural or synthetic source may be mixed with the uncoated grains and the dispersoid added during the mixing operation, or the dispersoid, specifically butyl oleate, may be caused to coat such abrasive grain and subsequently the dry reactive pulverized resin added thereto. The eventual mass, if compounded within required limits, will be granular with the resin properly distributed and suspended on the abrasive grain.

It will therefore be noted that through the use of a resin non-solvent I am able to obtain a two phase system so far as the reactive resin is concerned, wherein such resin appears to be in a dispersed phase while the non-solvent or dispersoid is in a continuous phase enveloping each particle of resin with a temporary modifying film which prevents the formation of gummy masses difficult to level and distribute in order to obtain a nicety of dynamic balance in the finished molded abrasive body.

Such dispersoid not being a solvent offers further advantages inasmuch as there is little or no absorption, and certainly within the coated mass leaving the mixer there is practically no change over a period of days and, therefore, such mixtures of grain may be made up prior to use and may be pressed as customer's requirements demand.

The gum accroides previously mentioned being soluble in most aldehydes can readily be dissolved in aldehydes such as furfural, benzaldehyde, butyl aldehyde, etc., producing a solution of a potentially reactive or heat setting natural resin due to the hardening action of these aldehydes upon the gum accroides dissolved therein. It is, therefore, to be understood that the abrasive grain may be coated with a solution of this natural reactive resin in a suitable solvent and hardening agent and that, if desired, a supplementary hardening agent such as hexamethylenetetramine may likewise be added thereto. It is also to be understood that I may coat abrasive grains with a suitable natural resin solvent such as the various alcohols or the aldehydes just mentioned and subquently cause the gum accroides to be spread over the surface of the abrasive grains while in such solution. I may subsequently or at any suitable time incorporate therewith other synthetic resinous products if the requirements demand a modified product. However, whether or not a potentially reactive synthetic resin is incorporated with the gum accroides it is to be understood that the gum accroides is rendered potentially reactive to practically the same extent as a synthetic resin product when in the presence of particularly active methylene bodies in condition to combine therewith or more slowly in the presence of other aldehydes. The presence of other synthetic resins tends to further accelerate the reactivity of these products. An organic bonded wheel wherein a natural resin of the potentially reactive type such as gum accroides is used provides a product having to a great extent the desirable attributes of a shellac bonded wheel without the thermoplasticity of the latter product.

In order that my invention may be better understood, I am giving the following illustrative example:

Into a suitable mixing device such as is used in the making of abrasive wheels, as, for example, a paddle type mixer, I place, in parts by weight, the following ingredients:

| | Parts |
|---|---|
| Aluminous oxide, #16 grain | 30 |
| Aluminous oxide, #20 grain | 30 |
| Aluminous oxide, #24 grain | 30 | and cause the same to be thoroughly mixed. While the mixer is in operation I add 3.4 parts of a suitable potentially reactive liquid resin which may, for example, be a low melting point phenol-formaldehyde resin or which can be, for that matter, a solution of gum accroides. After the abrasive grains are thoroughly coated with this liquid resin I add thereto 8.3 parts of a finely pulverized, potentially reactive resin which may be of either the synthetic resin type or of the natural potentially reactive resin type. It will be found that this dry resin will adhere to the coating of sticky, low melting point resin, and after this dry resin is thoroughly mixed in the batch I add thereto .5 part of a dispersoid, preferably butyl oleate. This butyl oleate will cause the mass to become granular and will eliminate the sticky, tacky condition which would otherwise prevail. The mass may now be set aside in shallow pans for use in forming the wheels in suitable molds preferably by cold pressing although heated molds may be used if so desired.

It is to be understood that the liquid resin used may be varied depending upon the viscosity and tackiness of such liquid resin product and that a larger proportion of such liquid product will be needed either with an increase in the viscosity of it or with a decrease in the size of the abrasive grain so coated. This liquid resin may be eliminated entirely by substituting therefor a suitable quantity of a dispersoid such as the ethyl or butyl oleate with which the abrasive grains may be coated and to which subsequently a desired amount of pulverized reactive resin has been subsequently added. Where such liquid resin is not used, a proportionate increase in parts by weight of dry resin should be added in order to produce a wheel of substantially the same grade. The quantity of dispersoid used may be varied in wide limits, depending upon the technical effect desired, but usually varies from say two to twenty per cent of the weight of reactive resinous product used.

Each wheelmaker has his own specifications as to the size of abrasive grain to be used for a particular type of work, and it is, of course, to be understood that any mixture of grains may be used and that any suitable abrasive material may be substituted for the aluminous oxide used illustratively in my example. Uses to which abrasive wheels are to be put demand variations in hardness, cutting qualities, etc., and it is to be understood, therefore, that wide variations and departures in the formula given illustratively will be necessary to meet a particular type of product. These variations in grain sizes requires variations in the amount of synthetic resin used and in the proportion of dispersoid such as the butyl oleate used therewith, and such optimum quantities can readily be determined by the wheelmaker through test batches as is at present done in the case of other bonding mixtures. The density of the finished wheel also calls for variations in pressing, and the formation of these wheels in a cold mold will ordinarily require a pressure of from 500 to 3000 pounds to the square inch of wheel surface being pressed. Likewise, some wheelmakers prefer to press their wheels in heated molds and this can be done to suit the particular requirements, the temperature varying from molds which are only slightly warm to molds heated above 300° F. and, therefore, the heat may be only sufficient to induce further plasticity into the mixture without actually causing any reaction to ensue within the resinous mass or may be high enough to precure or in some cases actually set the abrasive bodies to their final hard, set and infusible form while being pressed in the heated mold.

The formed wheels may be set aside and if still in an uncured condition may at any future time be hardened to their ultimate set form by being placed into a suitable oven and heated for varying periods of time, depending on the thickness of the wheels and the nature of the ovens available for this purpose. The baking is usually done in suitable atmospheric, indirect heat ovens. The articles are usually buried in sand when placed in the oven. In general, it is desirable to reach a maximum temperature of 380 to 400° F. by 10° or greater increments in temperature over a period of from 24 to 55 hours. Two typical baking cycles are given below:

| 51 hour bake | 25 hour bake |
| --- | --- |
| 4 hours at 170° F. | 3 hours at 200° F. |
| 4 hours at 190° F. | 3 hours at 220° F. |
| 5 hours at 200° F. | 3 hours at 240° F. |
| 4 hours at 210° F. | 3 hours at 260° F. |
| 4 hours at 220° F. | 2½ hours at 280° F. |
| 4 hours at 230° F. | 2 hours at 310° F. |
| 4 hours at 240° F. | 3½ hours at 350° F. |
| 4 hours at 250° F. | 5 hours at 380° F. |
| 4 hours at 270° F. | |
| 3 hours at 290° F. | 25 hours |
| 3 hours at 310° F. | 1½ hours cool to 200° F. |
| 2 hours at 310° to 390° gradual rise | |
| 6 hours maintained at 390° | |
| 51 hours | |

While I have stressed these non-solvents used in my process as being for the purpose of eliminating screening and rescreening by providing a mass which is normally not gummy, it is also to be understood that the use of these non-solvents is quite essential for the removal of volatile constituents from the interior of a heavy cross sectional abrasive body, as these non-solvents assist in the removal of such volatile constituents. It is extremely difficult to provide a wheel of say 3" thickness and fairly large diameter which will be thoroughly cured on the interior inasmuch as the volatile constituents are not readily vaporized therefrom, with the result that the reaction of the mass within the interior is slowed down very materially and such wheels are uneconomical for use after the first few inches of the peripheral face has been removed in operation. By providing either a dispersoid or a non-solvent for the resin mass, I am enabled to cure thick cross sections of wheels as well in the interior as on or near its faces.

The non-solvent which I use, and which in most cases acts as a dispersoid, need not remain within the wheel structure if such product is of a low boiling point such as carbon tetrachloride, benzol, etc. On the other hand, the dispersoid I prefer to use (an alkyl ester of a fatty acid and, more specifically, butyl oleate) remains largely within the wheel structure but is so occluded or dispersed in the mass during the final curing operation that it not only assists in the removal of the volatiles from the interior but aids as a fluxing agent in providing well rounded off angularities and otherwise serves as a modifying or plasticizing agent for such resin.

By the term dispersoid I mean to embrace various liquid resin non-solvents which are substantially water free and which are capable of wetting or coating the resinous material and assist in the removal of the volatile constituents from the interior of the molded and formed abrasive body. My preference, however, is to use such dispersion mediums for my dispersoid as are capable of wetting and at the same time precipitating the potentially reactive resinous body into a dispersed phase while the dispersion medium during the coating operation remains in the external phase. It is highly important, however, that these liquid or semi-liquid dispersion mediums be substantially water free as occluded water within the resin mass acts as an anti-catalyst and interferes seriously with the final hardening of thick cross sections of abrasive bodies. Therefore, wherever I use the term dispersion medium I mean a substantially water free wetting agent which is substantially a resin non-solvent.

It is also to be understood that I may add various other solid, liquid or gaseous modifying agents should I deem it desirable to alter the characteristics of the resin to meet a particular wheelmaker's requirements. These modifying agents are already well known in the resin art and, therefore, will not be described in detail.

It is to be understood that my description and disclosures herein are purely illustrative and are not intended to be in any sense limited and that those skilled in the art to which my invention relates will find it possible and in many cases desirable to make alterations in the proportions, order and manner of mixing, etc. which will suggest themselves without departing from the spirit and scope of my invention.

What I claim is—

1. An abrasive composition comprising, abrasive grains, a gum accroides resin and a hardening reagent therefor.

2. An abrasive composition, comprising, abrasive grains, gum accroides and an aldehyde derivative.

3. An abrasive composition comprising, abrasive grains, gum accroides and hexamethylenetetramine.

4. In abrasive composition comprising, abrasive grains, gum accroides, hexamethylenetetramine and furfural.

5. An abrasive composition comprising, abrasive grains in intimate contact with a natural resin of the gum accroides type converted to a potentially reactive resin by having a hardening agent intimately incorporated therewith and having mixed therewith an alkyl ester of a fatty acid as a dispersion medium.

6. An abrasive composition comprising, abrasive grains and a mixture of a potentially reactive resin comprising gum accroides and a synthetic resin, said body having incorporated therewith a hardening agent in the form of an active methylene body in combination to combine therewith.

7. An abrasive composition comprising, abrasive grains and a mixture of potentially reactive resins including gum accroides and a urea synthetic resin.

8. The method of making an organic bonded abrasive composition comprising the step of coating the abrasive grains with a composition including a gum accroides resin in the presence of a substantially water free dispersion medium.

Signed at Philadelphia in the county of Philadelphia and State of Pennsylvania this 15th day of May A. D. 1930.

EMIL E. NOVOTNY.